(No Model.)
F. H. HILLMAN & E. J. GUILE.
COW MILKER.
No. 543,868. Patented Aug. 6, 1895.
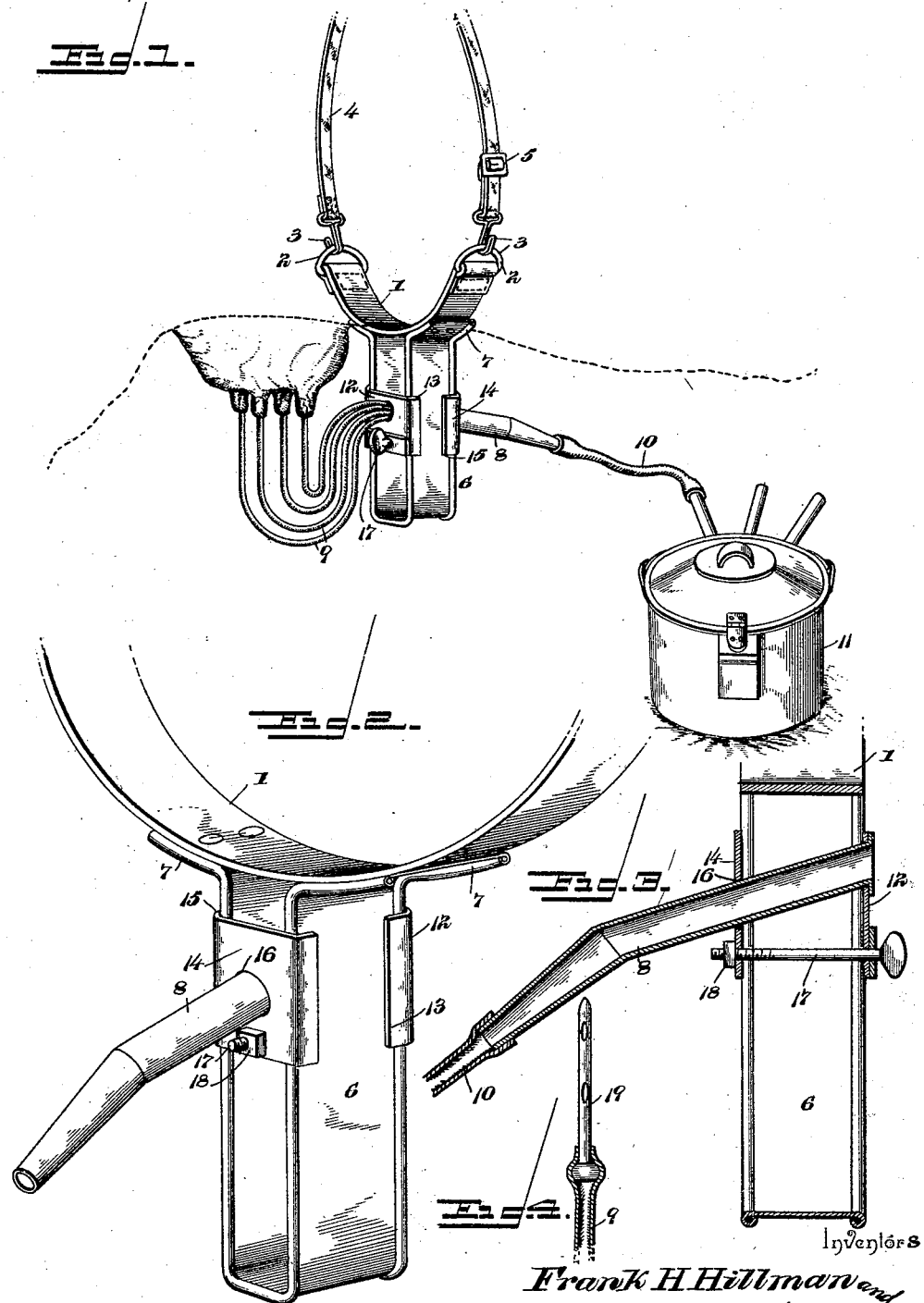
Witnesses
E. K. Stewart
V. B. Hillyard
Inventors
Frank H. Hillman and
Emerson J. Guile
By their Attorneys
C. A. Snow & Co.

UNITED STATES PATENT OFFICE.

FRANK H. HILLMAN AND EMERSON J. GUILE, OF GREENWICH, NEW YORK.

COW-MILKER.

SPECIFICATION forming part of Letters Patent No. 543,868, dated August 6, 1895.

Application filed March 12, 1895. Serial No. 541,492. (No model.)

*To all whom it may concern:*

Be it known that we, FRANK H. HILLMAN and EMERSON J. GUILE, citizens of the United States, residing at Greenwich, in the county of Washington and State of New York, have invented a new and useful Cow-Milker, of which the following is a specification.

The purpose of the present invention is to improve that class of appliances which are used for extracting the milk from cows without necessitating the manipulation of the teats in any manner, and which depend for their successful operation upon teat or milking tubes, which are inserted in the cow's teats and draw off the milk by a combined action of gravity and the contracting tendency of the udder.

In appliances of this character as heretofore constructed, pain and injury has resulted to the cow, due, primarily, to the entrance of air into the udder while the latter is relieving itself of the milk; and the object of the present invention is to obviate this serious objection and guard against the entrance of any air into the udder during the milking process, and at the same time provide an appliance which can be readily adapted to cows of different sizes, and which will be simple and perform the required work in a rapid and satisfactory manner and without inflicting the least pain or inconveniencing the cow in the least.

With these and such other objects in view as may result from the special construction of the appliance, the improvement consists of the novel features and the particular construction and combination of the parts, which hereinafter will be more fully set forth and claimed, and which are shown in the accompanying drawings, in which—

Figure 1 is a perspective view showing the application of the invention. Fig. 2 is a detail view of the frame, its supporting-strap, and the receiving-spout, showing the means for adjustably connecting the latter with the said frame. Fig. 3 is a central vertical section of the frame and the parts connected therewith. Fig. 4 is a detail view of a teat-piece.

Referring to the drawings, the numeral 1 represents the supporting-strap to which the appliance is attached, and which has loops 2 at its ends for engagement therewith of hooks 3 at the ends of the back-band 4, by means of which the machine is attached to the cow to be milked. The back-band 4 is adjustable, being provided with the sliding buckle 5, which is adapted to move upon the back-band and has an end of the latter attached thereto, so as to lengthen or shorten the back-band in the ordinary manner by moving the buckle 5, thereby adapting the length of the back-band to suit the girth of the cow to which the machine is to be attached.

The frame 6 is attached to the strap 1 and is preferably U-shaped in front elevation and formed from sheet metal, which has its edge portions wired and its end portions 7 bent outwardly and secured to the strap 1 by rivets or in any convenient manner.

The receiving-spout 8 is adjustably connected with the frame 1, so as to be raised or lowered to bring its receiving end above the cow's teat, so as to cause a bend in the milking-tubes 9, whereby air is prevented from passing through the latter into the udder during the milking process. The receiving-end portion of the spout 8 is sufficiently large to receive a plurality of milking-tubes 9, and its discharging end is contracted so as to receive the end of a conveying-tube 10, by means of which the milk is discharged into a suitable receptacle 11, located at a convenient point.

A plate 12 is attached to the receiving-spout 8 in any desired manner, preferably by being soldered thereto, and its edge portions are bent to provide flanges 13, which embrace the sides of the frame 1. A corresponding plate 14, having flanges 15, is provided with an opening 16, through which the spout 8 passes. These two plates 12 and 14 are placed upon opposite sides of the frame 1 and are clamped upon the edges thereof by means of a binding-screw 17, which passes through the said plates and has its threaded end entered into a burr or nut 18 provided on one of the plates, as 14. The plate 12 is reinforced at the point where the binding-screw 17 passes through, so as to withstand the strain of the binding-screw when the latter is turned up tight, so as to secure the receiving-spout 8 in the desired position.

The milking-tubes 9, which are small and formed of any desired material, rubber being preferable, are provided at one end with teat-pieces 19, attached thereto in any desired manner, and which in the operation of the invention are designed to be inserted into the cow's teats for the purpose of extracting the milk from the udder. The delivery ends of the milking-tubes 9 are thrust into the receiving-spout a sufficient distance to insure a safe delivery of the milk therein, and a bend is formed between their ends to provide a trap which will exclude the entrance of air into the udder.

It will be understood that in the application of the invention one milking-tube will be provided for each teat, and that the teat-pieces 19 will be inserted into the teat in the usual manner to draw off the milk from the udder, the delivery ends of all the tubes 9 being inserted into the receiving-spout, from which the milk is conveyed by means of the conveyer-tube 10 to the receptacle.

In adjusting an appliance constructed in accordance with the principles of the present invention it is essential that the receiving-spout 8 occupy a higher level than the cow's teats, so that a bend may be provided in each of the milking tubes 9 to form a trap or liquid-seal to prevent the passage of air into the udder during the milking operation, as such feature is the essence of the present invention. The receiving spout 8 inclines downwardly from its receiving end so as to drain off and prevent the lodgment of milk therein.

In constructing appliances embodying the gist of the present invention it is obvious that changes in the form, proportion, and the minor details of construction may be resorted to without departing from the principle or sacrificing any of the advantages of this invention.

Having thus described the invention, what is claimed as new is—

1. In a milking appliance, the combination with a frame, and means for suspending the frame from the animal, of a receiving spout, provisions for vertically adjusting the receiving spout and securing the same to the frame in the adjusted position, and a plurality of milking tubes provided at one end with teat pieces and adapted to have their opposite ends inserted in one end of the said receiving spout, substantially as set forth for the purpose described.

2. In a milking appliance, the combination of a supporting strap, means for attaching the same to the animal, a frame pendent from the supporting strap, a receiving spout having one end enlarged and the opposite end contracted, provisions for vertically adjusting the receiving spout upon the frame and attaching it thereto in the located position, a conveyer tube attached to the contracted end of the receiving spout, and a plurality of milking tubes provided at one end with teat pieces and adapted to have their opposite ends loosely inserted into the enlarged end of the aforesaid receiving spout, substantially as set forth for the purpose described.

3. The herein shown and described milking appliance, comprising a supporting strap, a back band having adjustable connection with the ends of the said supporting strap, an approximately U-shaped frame secured to the supporting strap, a receiving spout having a plate attached thereto provided with flanges to embrace the sides of the frame, a corresponding plate flanged at its edges to embrace the sides of the frame and apertured for the passage of the receiving spout, a binding screw to clamp the said plates upon the edges of the frame, a plurality of milking tubes having teat pieces at one end, and adapted to have the opposite end inserted within the receiving end of the said spout, and a conveyer tube to be attached to the delivery end of the receiving spout, substantially as herein set forth.

In testimony that we claim the foregoing as our own we have hereto affixed our signatures in the presence of two witnesses.

FRANK H. HILLMAN.
EMERSON J. GUILE.

Witnesses for Hillman:
  JOHN H. SIGGERS,
  HAROLD H. SIMMS.
Witnesses for Guile:
  HARRY S. WHELDEN,
  GEO. P. ROBINSON.